United States Patent
Mastrangelo et al.

(10) Patent No.: US 6,422,567 B1
(45) Date of Patent: Jul. 23, 2002

(54) STORAGE SYSTEM FOR VEHICLES

(75) Inventors: James J. Mastrangelo, Troy; Gregory J. Vishey, Grosse Pointe Woods; Daniel E. Hawkins, Milford; Wendy M. Beadle, Macomb; John J. Blewett, Waterford; Joseph M. Heilig, Shelby Township, all of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/399,576

(22) Filed: Sep. 20, 1999

(51) Int. Cl.[7] .............................. B60R 5/04; B60R 7/02; B60R 9/055; B62D 33/04; B60P 1/64
(52) U.S. Cl. .................... 276/37.1; 296/37.6; 296/37.7; 296/37.8; 296/37.11; 224/404; 224/281; 312/334.45; 312/333; 410/67; 410/80
(58) Field of Search ............................... 296/37.1, 37.6, 296/37.7, 37.8, 37.14, 37.16, 24.1, 26.09, 26.13, 26.03; 414/522; 224/404, 328, 281, 498; 312/334.27, 334.39, 334.42, 334.45, 333; 410/66, 67, 80

(56) References Cited

U.S. PATENT DOCUMENTS

| | | | | |
|---|---|---|---|---|
| 1,303,854 A | * | 5/1919 | Clark ........................... | 410/80 |
| 1,360,412 A | * | 11/1920 | Kirchner ....................... | 410/80 |
| 2,014,019 A | * | 9/1935 | Girl ........................... | 296/37.1 |
| 2,091,071 A | * | 8/1937 | Girl ........................... | 224/42.13 |
| 2,094,401 A | | 9/1937 | Girl | |
| 2,172,154 A | * | 9/1939 | Perin ........................... | 410/66 |
| 2,784,027 A | * | 3/1957 | Temp ........................... | 224/404 |
| 2,792,137 A | * | 5/1957 | Solomon et al. .......... | 296/26.09 |
| 2,797,828 A | | 7/1957 | Fritsche | |
| 2,934,248 A | * | 4/1960 | Lown ........................... | 224/542 |
| 3,132,755 A | * | 5/1964 | Greenslate ................... | 224/401 |
| 3,375,959 A | | 4/1968 | Hamilton | |
| 3,826,529 A | * | 7/1974 | Wood ........................... | 296/37.6 |

(List continued on next page.)

FOREIGN PATENT DOCUMENTS

| | | |
|---|---|---|
| DE | 44 32 369 A1 | 3/1996 |
| DE | 196 19 126 A | 11/1997 |
| WO | WO 82/02175 | 7/1982 |

OTHER PUBLICATIONS

Derwent English Abstract of German DE 44 32 369 A1.
Derwent English Abstract of German DE 196 19 126 A1.

Primary Examiner—Stephen T. Gordon
Assistant Examiner—H. Gutman
(74) Attorney, Agent, or Firm—Brooks & Kushman P.C.

(57) ABSTRACT

A storage system for a motor vehicle having a floor includes a plurality of retainer brackets adapted to be secured to the floor, and a base having a body and a plurality of mounting brackets attached to the body. The body has first and second inclined tracks. The mounting brackets are engageable with the retainer brackets so as to secure the base to the floor. At least one of the mounting brackets is moveable with respect to the body so that the at least one mounting bracket may be engaged with a respective retainer bracket after the body is positioned with respect to the floor. Furthermore, the storage system includes a movable storage unit having a plurality of wheels that are engageable with the tracks.

44 Claims, 9 Drawing Sheets

U.S. PATENT DOCUMENTS

| | | | |
|---|---|---|---|
| 4,303,367 A | * 12/1981 | Bott | 224/281 |
| 4,433,804 A | * 2/1984 | Bott | 224/321 |
| 4,573,731 A | 3/1986 | Knaack et al. | |
| 4,635,992 A | * 1/1987 | Hamilton et al. | 224/404 |
| 4,705,315 A | * 11/1987 | Cherry | 296/37.6 |
| 4,733,898 A | 3/1988 | Williams | |
| 4,752,095 A | 6/1988 | Brady | |
| 4,824,158 A | 4/1989 | Peters et al. | |
| 4,828,312 A | * 5/1989 | Kinkel et al. | 296/37.6 |
| 4,830,242 A | * 5/1989 | Painter | 296/37.6 |
| 4,909,558 A | * 3/1990 | Roshinsky | 296/37.6 |
| 4,915,437 A | 4/1990 | Cherry | |
| 4,946,215 A | 8/1990 | Taylor | |
| 4,997,118 A | * 3/1991 | Uebach et al. | 224/328 |
| 5,046,913 A | 9/1991 | Domek et al. | |
| 5,090,335 A | * 2/1992 | Russell | 296/24.1 |
| 5,121,959 A | * 6/1992 | King | 296/37.6 |
| 5,161,700 A | 11/1992 | Stannis et al. | |
| 5,167,433 A | 12/1992 | Ryan | |
| 5,184,931 A | 2/1993 | Safko | |
| 5,301,992 A | * 4/1994 | Whitmore | 296/37.1 |
| 5,348,207 A | * 9/1994 | Frank | 224/328 |
| 5,358,162 A | * 10/1994 | Hill | 224/316 |
| 5,381,940 A | 1/1995 | Wright | |
| 5,419,476 A | 5/1995 | White | |
| 5,454,684 A | * 10/1995 | Berens | 296/26.1 |
| 5,469,999 A | 11/1995 | Phirippidis | |
| 5,513,941 A | * 5/1996 | Kulas et al. | 296/26.09 |
| 5,535,929 A | * 7/1996 | Neill | 224/328 |
| 5,556,015 A | * 9/1996 | Vincent | 224/328 |
| 5,564,767 A | * 10/1996 | Strepek | 296/37.6 |
| 5,603,439 A | * 2/1997 | Pineda | 224/403 |
| 5,634,408 A | 6/1997 | Jarkowski | |
| 5,667,116 A | * 9/1997 | Reinhart et al. | 224/319 |
| 5,669,537 A | 9/1997 | Saleem et al. | |
| 5,673,831 A | * 10/1997 | Spratt | 224/281 |
| 5,683,132 A | 11/1997 | Danzo et al. | |
| 5,762,244 A | * 6/1998 | Wagner et al. | 224/281 |
| 5,860,576 A | * 1/1999 | Duran | 224/309 |
| 5,934,725 A | * 8/1999 | Bowers | 296/37.6 |
| 5,988,722 A | * 11/1999 | Parri | 296/26.09 |
| 6,000,740 A | * 12/1999 | Hall et al. | 296/37.6 |
| 6,015,177 A | * 1/2000 | Tijerina | 296/37.6 |
| 6,022,181 A | * 2/2000 | Wolterstorff et al. | 296/37.6 |
| 6,059,339 A | * 5/2000 | Madson | 224/404 |
| 6,068,168 A | * 5/2000 | Kreisler | 224/309 |

* cited by examiner

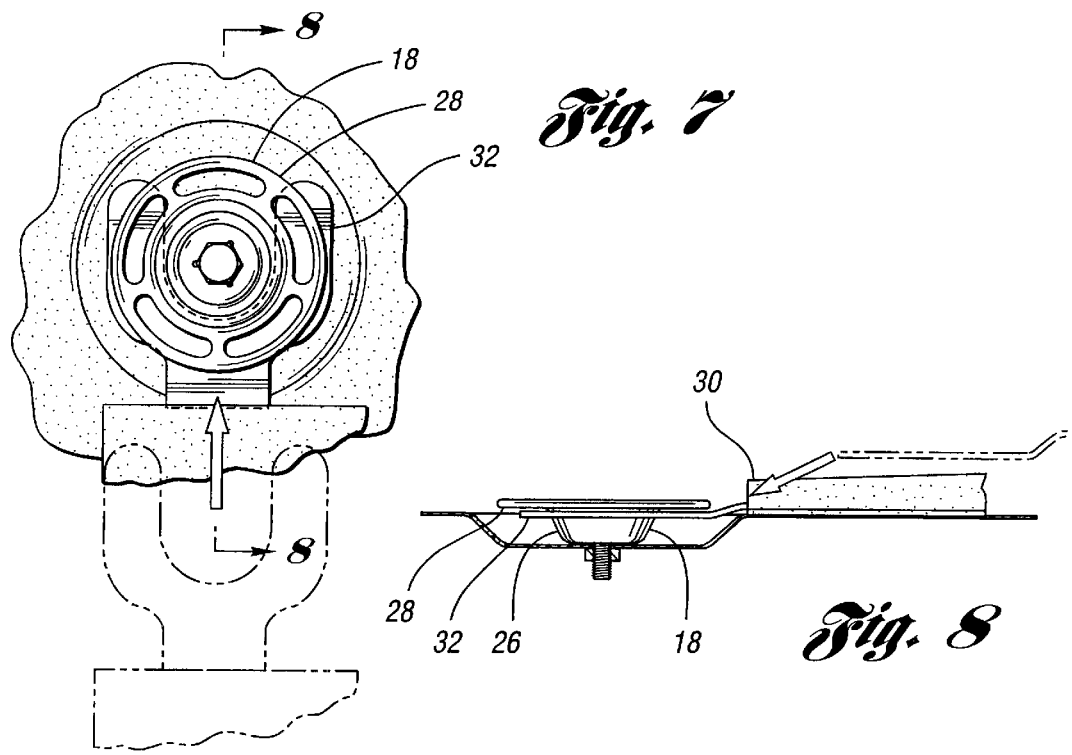
Fig. 7
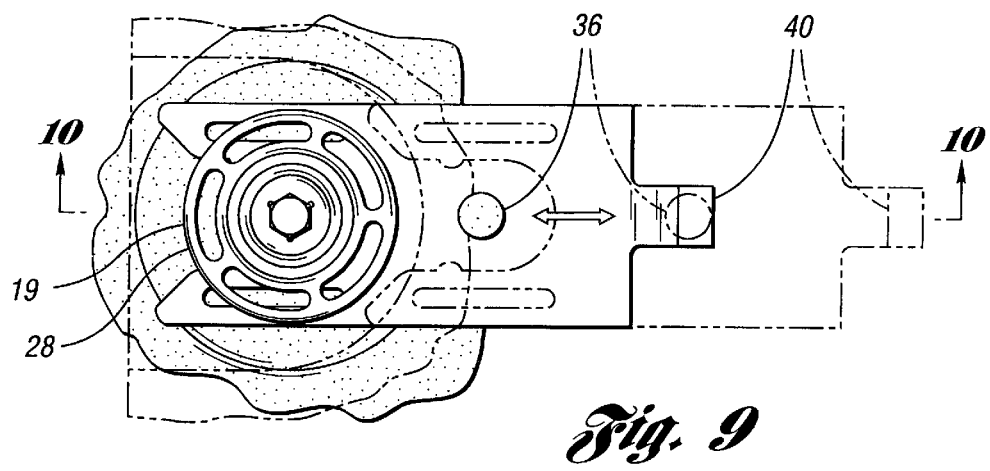
Fig. 8
Fig. 9
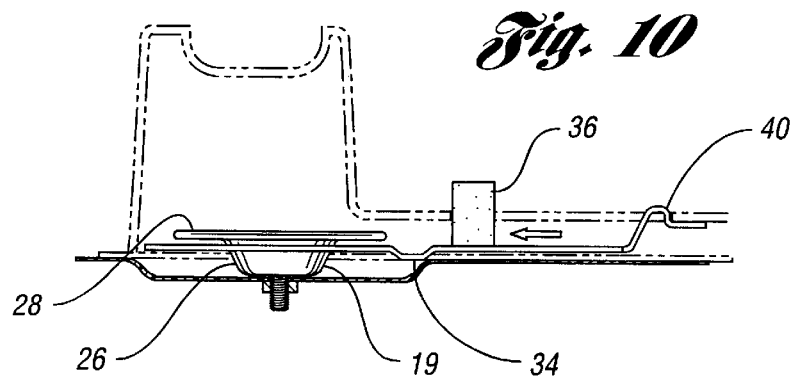
Fig. 10

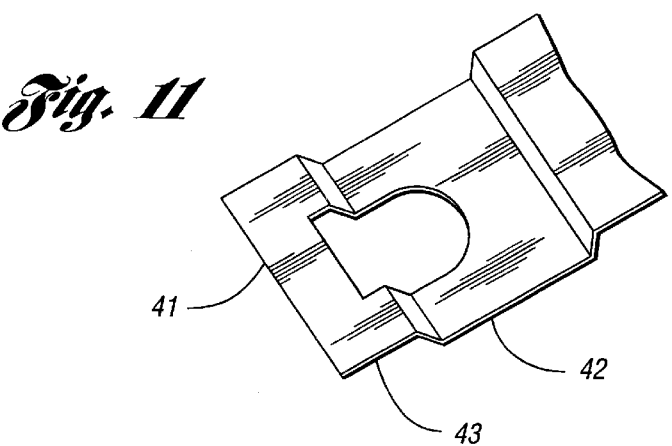
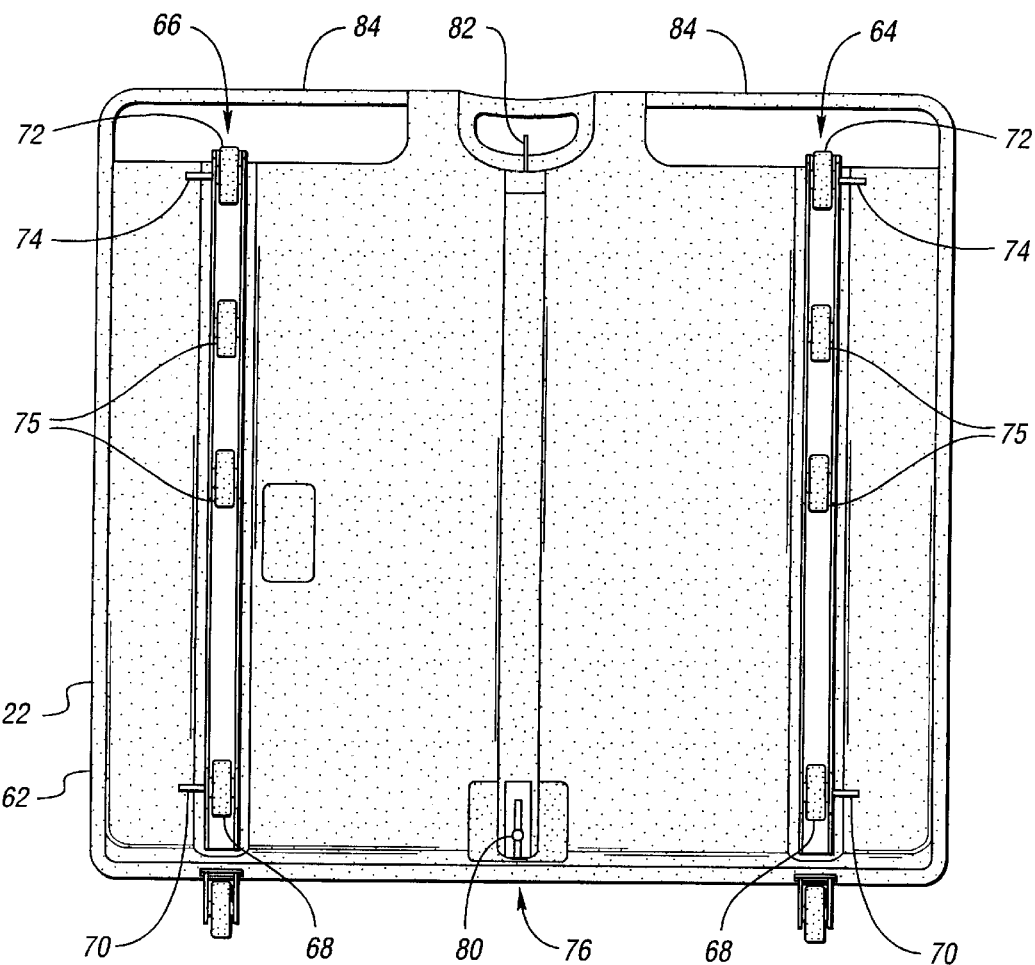

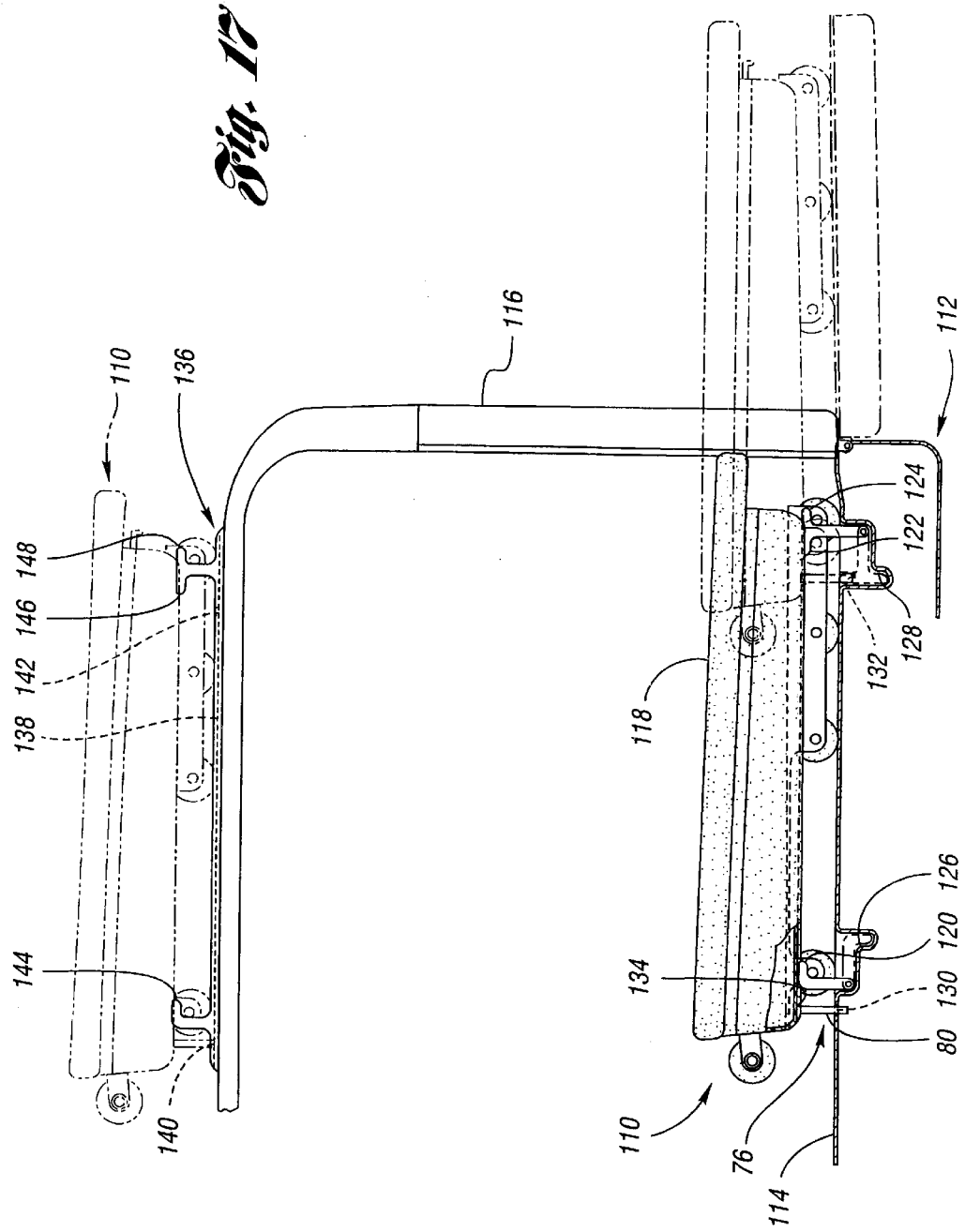

STORAGE SYSTEM FOR VEHICLES

TECHNICAL FIELD

The invention relates to a storage system for a motor vehicle, wherein the storage system includes one or more tracks adapted to be secured to the vehicle, and a movable storage unit having one or more wheels that are engageable with the one or more tracks.

BACKGROUND ART

U.S. Pat. No. 5,634,408 discloses a removable cargo tray for use with a vehicle having a cargo space. The cargo tray includes a plurality of rollers attached to a body, and the cargo tray is slidably disposable in the vehicle. However, the cargo tray is independent of, and devoid of any attachment to, the vehicle. Consequently, the cargo tray may experience significant movement within the cargo space while the vehicle is in use. Furthermore, the cargo tray does not include any feature to control movement of the cargo tray as the cargo tray is partially or fully removed from the vehicle.

U.S. Pat. No. 4,573,731 discloses a drawer-type storage unit for use with a vehicle having a floor and a tailgate. The storage unit has a housing that defines a raised floor when installed on the vehicle floor, and a drawer movably disposed in the housing. Although the raised floor of the housing may be used to support articles placed thereon, the raised floor is not easily accessible when the tailgate is open. In addition, the storage unit cannot be easily removed from the vehicle for use outside of the vehicle.

DISCLOSURE OF INVENTION

The invention overcomes the shortcomings of the prior art by providing a new and improved storage system for a motor vehicle, wherein the storage system includes a movable storage unit that may be secured to the vehicle in a stowed position. The storage unit is also movable to a deployed position so that the storage unit is easily accessible.

In one embodiment of the invention, a storage system for a motor vehicle includes a securing member attachable to the vehicle. The storage system further includes a movable storage unit having a wheel and being movable between a stowed position and a deployed position with respect to the vehicle. Furthermore, the wheel has an axle engageable with the securing member to inhibit movement of the storage unit.

The storage system may further have a base adapted to be secured to the vehicle and including the securing member and a track. According to a feature of the invention, the track is preferably inclined so that the track slopes upwardly toward a rear end of the track. With such a configuration, the track enables gravity to assist the storage unit in moving from the deployed position to the stowed position. Furthermore, the track enables the storage unit to move above and over a raised sill that may be present at the rear of the vehicle.

The securing member may include first and second hooks that inhibit movement of the storage unit. For example, the axle may engage the first hook when the storage unit is in the stowed position, and the axle may engage the second hook when the storage unit is in the deployed position.

In another embodiment of the invention, a storage system for a motor vehicle having a floor includes a base having a body and a plurality of mounting brackets attached to the body. The mounting brackets are adapted to be attached to the floor so as to secure the base to the floor. The plurality of mounting brackets also includes a first mounting bracket that is movably attached to the body and is movable laterally with respect to the body along a straight line so that the first mounting bracket may be attached to the floor after the body is positioned with respect to the floor. The storage system further includes a movable storage unit engageable with the base.

In the above embodiment, the storage system may further include a plurality of retainer brackets adapted to be secured to the floor. The mounting brackets of the storage unit are then engageable with the retainer brackets for securing the base to the floor.

In each of the above embodiments that includes a base, the base may be provided with an aperture, and the storage unit may be provided with a retractable member that is engageable with the aperture for inhibiting movement of the storage unit relative to the base. Preferably, the base has two apertures, and the retractable member is selectively engageable with each of the apertures for inhibiting movement of the storage unit when the storage unit is in the stowed and deployed positions.

In another embodiment of the invention, a storage system for use with a motor vehicle includes a pair of first hooks adapted to be mounted to the vehicle such that the first hooks may be recessed into the vehicle when not in use. A storage unit having a plurality of wheels is movable between a stowed position and a deployed position. Furthermore, the plurality of wheels includes a pair of first wheels that are engageable with the first hooks to inhibit movement of the storage unit when the storage unit is in the stowed position.

In the above embodiment, the storage system may also include a pair of second hooks adapted to be mounted to the vehicle. Furthermore, the first wheels may be engageable with the second hooks to inhibit movement of the storage unit when the storage unit is in the deployed position.

According to a feature of the invention, the storage unit in the above embodiment may also be provided with a guide slot that is engageable with one of the first hooks to guide the storage unit as the storage unit moves between the stowed and deployed positions.

Advantageously, the storage unit in each of the above embodiments may be removed from the vehicle. Furthermore, the storage system in each of the above embodiments may include a roof mounted base, such as a luggage rack, for receiving the storage unit on top of the vehicle.

These and other objects, features and advantages of the invention are readily apparent from the following detailed description of the best modes for carrying out the invention when taken in conjunction with the accompanying drawings.

BRIEF DESCRIPTION OF DRAWINGS

FIG. 7 is a fragmentary top view of one of the front hooks and one of the front retainer brackets;

FIG. 8 is a fragmentary sectional view taken along line 8—8 of FIG. 7;

FIG. 9 is a fragmentary top view of one of the rear hooks and one of the rear retainer brackets;

FIG. 10 is a fragmentary sectional view taken along line 10—10 of FIG. 9;

FIG. 11 is a perspective fragmentary view of an alternative mounting bracket;

FIG. 12 is a bottom view of the storage unit showing a tray and a plurality of wheels attached to the tray and arranged in first and second rows;

FIG. 17 is a side view of a second embodiment of the storage system including a plurality of hooks movably mounted to the floor of the vehicle, and a luggage rack a storage unit movable with respect to the floor first between a stowed position, shown in solid lines, and a deployed position, shown in phantom lines, wherein the storage unit is also mountable on the luggage rack in a second stowed position, which is also shown in phantom lines.

BEST MODE FOR CARRYING OUT THE INVENTION

Figure 1:
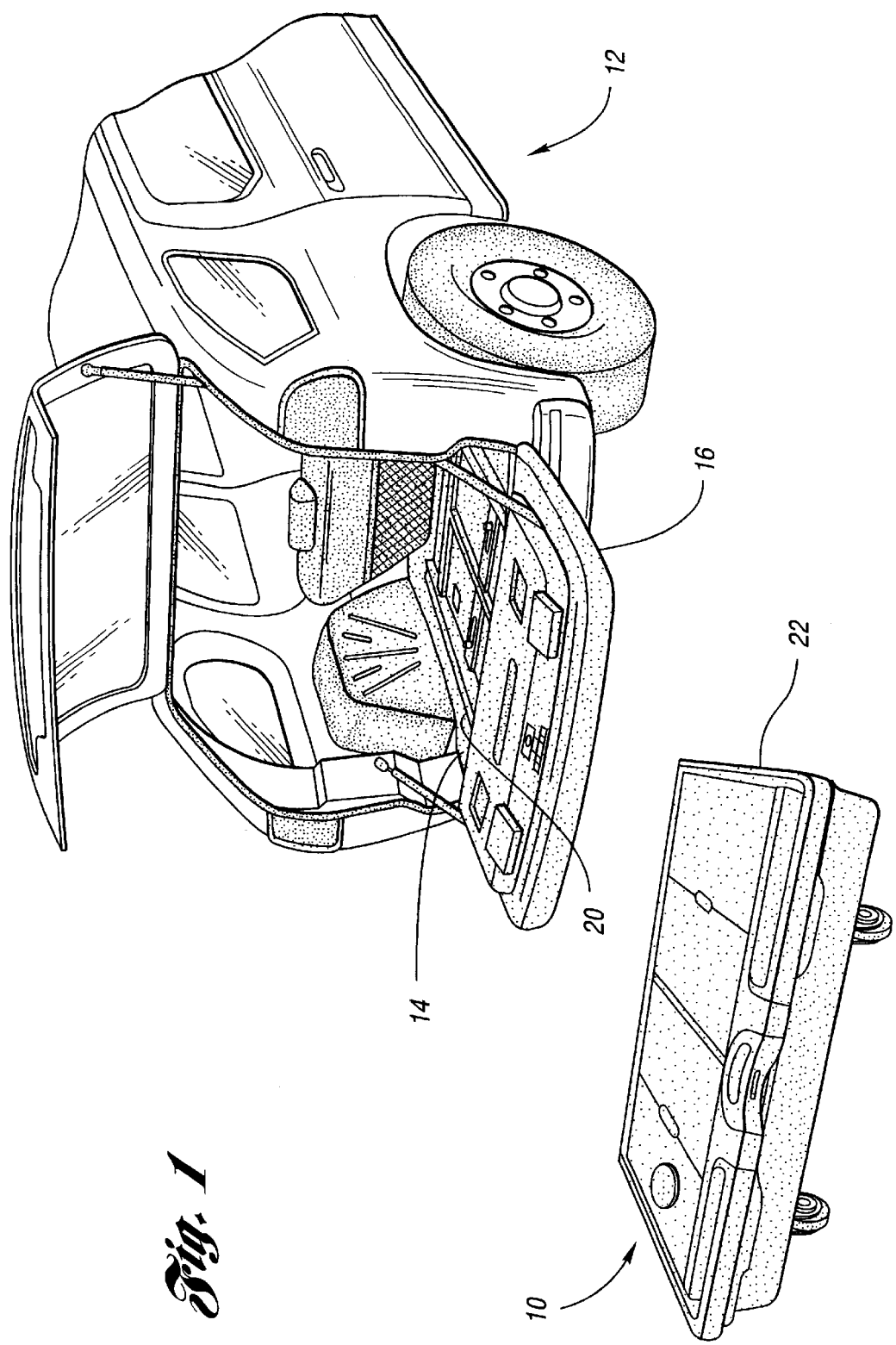
FIG. 1 is a perspective view of a storage system according to the invention for use with a motor vehicle having a floor and a tailgate.
Figure 2:
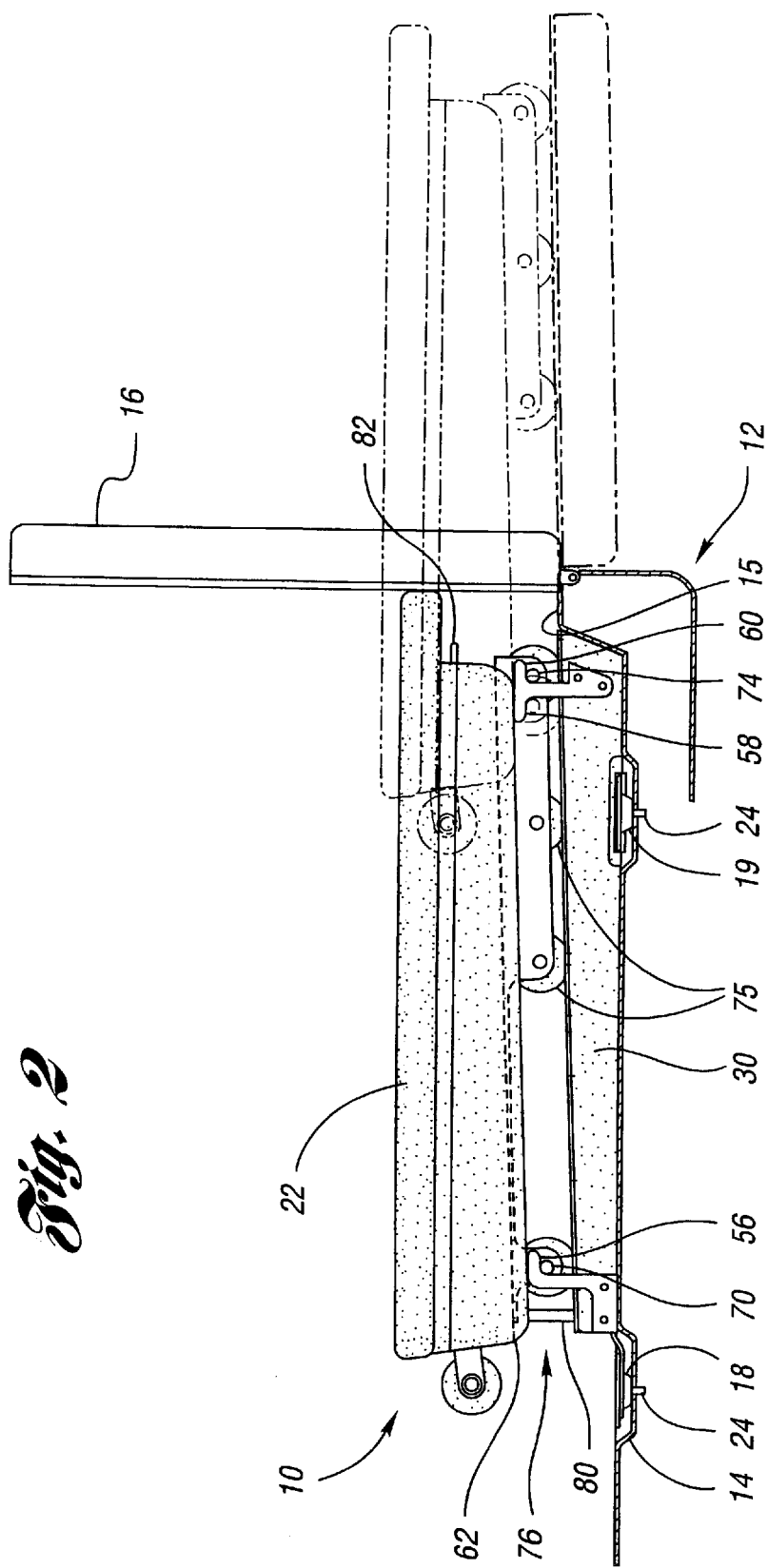
FIG. 2 is a side view of the storage system showing front and rear retainer brackets mounted to the floor of the vehicle, a base secured to the retainer brackets, and a storage unit engageable with the base and movable between a stowed position, shown in solid lines, and a deployed position, shown in phantom lines.

FIGS. 1 and 2 show a storage system 10 for use with a motor vehicle 12 having a floor 14, a sill 15 and a tailgate 16. The storage system 10 includes one or more front retainer brackets 18 and one or more rear retainer brackets 19, and the retainer brackets 18 and 19 are adapted to be mounted to the floor 14 of the vehicle 12. Preferably, the storage system 10 includes two front retainer brackets 18 and two rear retainer brackets 19. The storage system 10 further includes a base 20 that is engageable with the retainer brackets 18 and 19, and a movable storage unit 22 that is engageable with the base 20. The storage unit 22 is moveable between a stowed position shown in solid lines in FIG. 2, and a deployed position shown in phantom lines in FIG. 2. Advantageously, when in the deployed position, the storage unit 22 extends over the tailgate 16 so as to provide easy access to the storage unit 22. Furthermore, the base 20 and the storage unit 22 may be easily installed in and removed from the vehicle 12 as described below in greater detail.

As shown in FIG. 2, each retainer bracket 18 and 19 may be mounted to the floor 14 in any suitable manner such as with a bolt 24 or other suitable fastener. Alternatively, the retainer brackets 18 and 19 may be formed as part of the floor 14. As best seen in FIGS. 7–10, each retainer bracket 18 and 19 preferably has a frusto-conical lower portion 26, and a circular, generally planar portion 28 disposed above the lower portion 26. While the retainer brackets 18 and 19 may be made of any suitable material and in any suitable manner, the retainer brackets 18 and 19 are preferably made of stamped steel or a structural plastic such as polypropylene.

As shown in FIGS. 2–6, the base 20 has a body 30, a pair of front mounting brackets, such as front forks 32, attached to the body 30, and a pair of rear mounting brackets, such as rear forks 34, slidably attached to the body 30. Each rear fork 34 includes a handle 36 that extends through a channel 38 in the body 30, and each rear fork 34 may be moved with respect to the body 30 by sliding a respective handle 36 along a respective channel 38. The front and rear forks 32 and 34, respectively, are engageable with the front and rear retaining brackets 18 and 19, respectively, for securing the base 20 to the vehicle 12.

Figure 3:
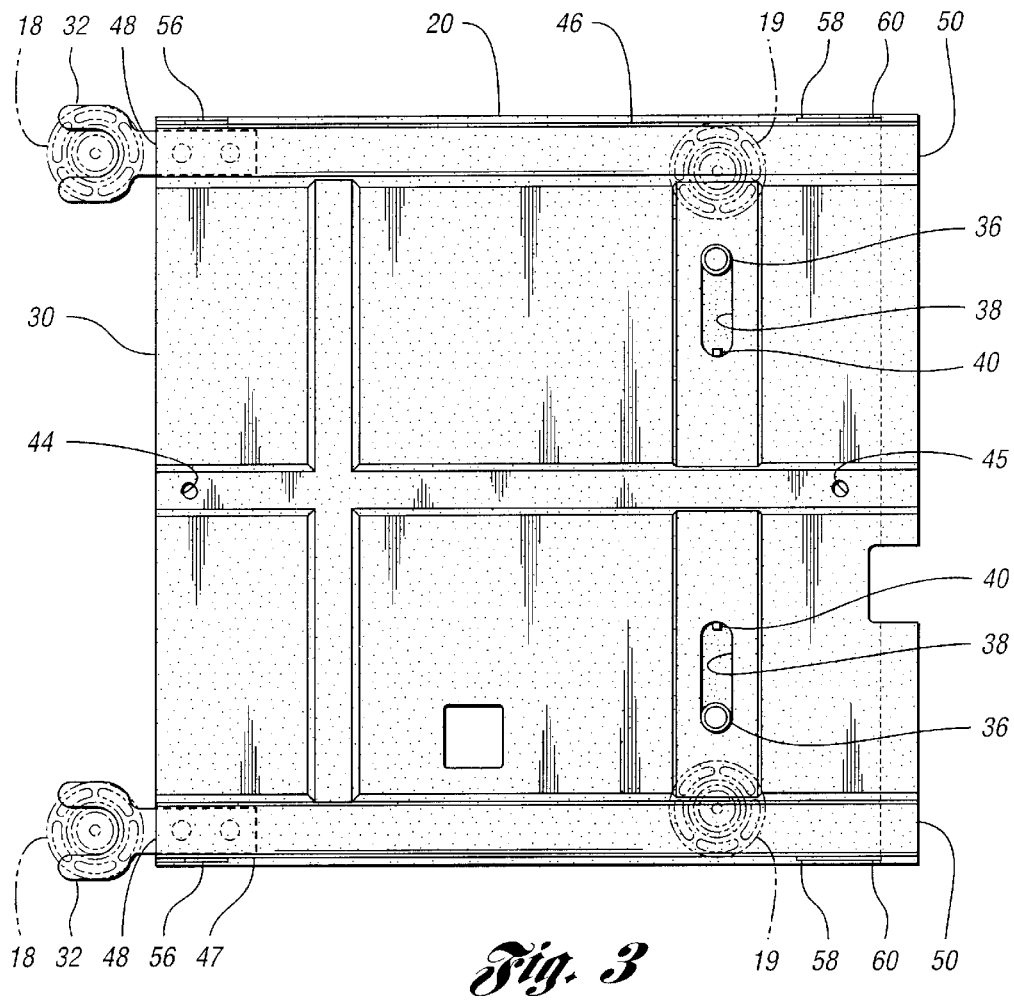
FIG. 3 is a top view of the base showing a body having first and second tracks, a pair of front hooks attached to the body, and a pair of rear hooks slidably attached to the body.
Figure 4:
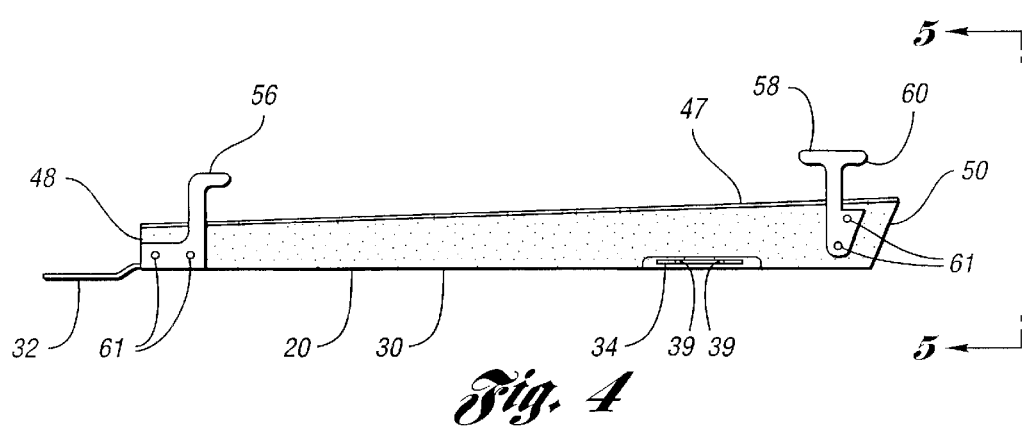
FIG. 4 is a side view of the base showing the second track, and first, second and third hooks disposed proximate front and rear ends of the second track.
Figure 5:
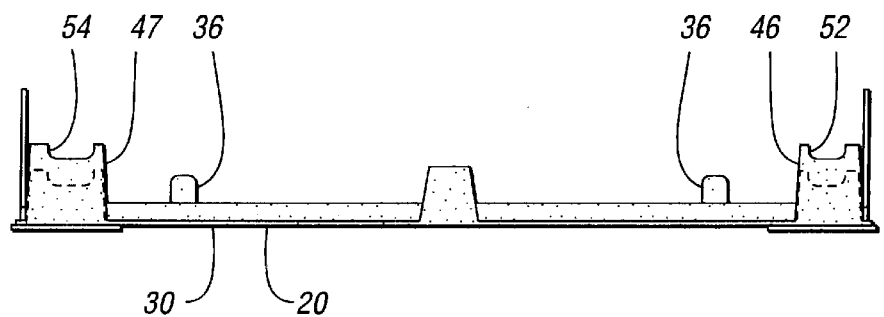
FIG. 5 is an end view of the base showing first and second guide troughs of the first and second tracks, respectively.
Figure 6:
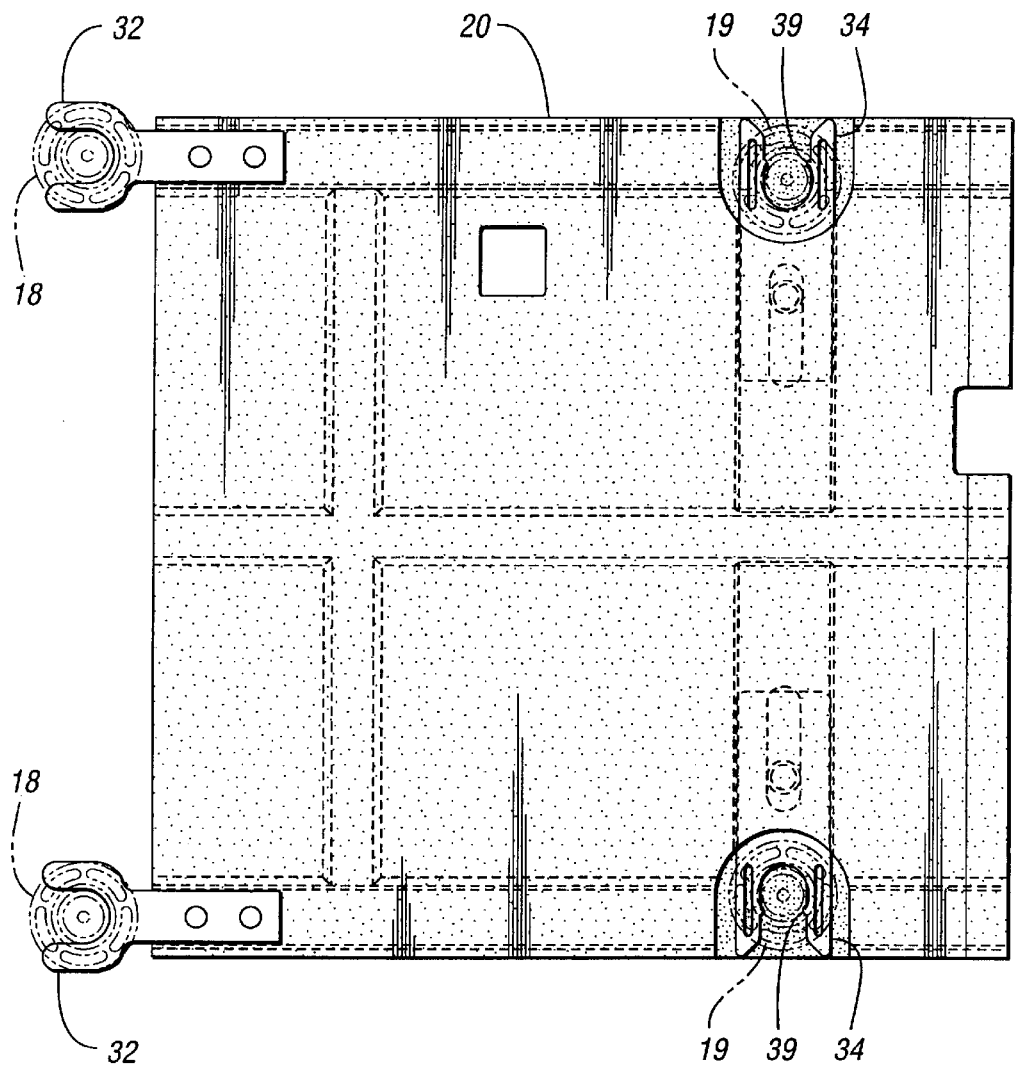
FIG. 6 is a bottom view of the base showing the front and rear hooks engaged with the front and rear retainer brackets, respectively.

As shown in FIGS. 7 and 8, the front forks 32 may be engaged with the front retainer brackets 18 as the body 30 is moved forwardly in the vehicle 12. After the body 30 has been properly positioned, the rear forks 34 may be moved into engagement with the rear retainer brackets 19, as shown in FIGS. 9 and 10. As shown in FIGS. 4 and 9, each rear fork 34 preferably has one or more engaging nubs 39 that engage a respective rear retainer bracket 19 so as to inhibit movement of each rear fork 34. Furthermore, as shown in FIGS. 3, 9 and 10, each rear fork 34 preferably has a movable tab 40 that is engageable with the body 30 to further inhibit movement of the rear forks 34 when the rear forks 34 are engaged with the rear retainer brackets 19. The tabs 40 may also be depressed below a top surface of the body 30 so that the rear forks 34 may be disengaged from the rear retainer brackets 19 by sliding the handles 36 along the channels 38. Alternatively, the body 30 may be provided with tabs that engage the rear forks 34 when the rear forks 34 are engaged with the rear retainer brackets 19. With the above configuration, the base 20 may be quickly and easily installed in and removed from the vehicle 12.

Alternatively, each of the front and/or rear mounting brackets may be a closed loop bracket 41 as shown in FIG. 11. The bracket 41 includes a lower portion 42 that is disposable beneath the generally planar portion 28 of each of the retainer brackets 18 and 19, and an upper portion 43 that rests on top of the planar portion 28 to improve load distribution.

Alternatively, the storage system 10 may be provided with any suitable mounting arrangement sufficient to secure the base 20 to the vehicle 12. For example, the base 20 may be provided with pins that are engageable with corresponding eyelets secured to or formed in the floor 14. As another example, the base 20 may be secured to the floor 14 using latches, bungey cords or any suitable fastening device.

Returning to FIGS. 3–5, the base 20 further has first and second apertures 44 and 45 and first and second inclined tracks 46 and 47 for receiving the storage unit 22. Each track 46 and 47 has front and rear ends 48 and 50, respectively. The first track 46 has a first guide trough 52, and the second track 47 has a second guide trough 54 that is wider than the first guide trough 52 to account for tolerance variations in the storage unit 22.

Additionally, the base 20 includes a pair of first securing members, such as hooks 56, disposed proximate the front ends 48 of the tracks 46 and 47; a pair of second securing members, such as hooks 58, disposed proximate the rear ends 50 of the tracks 46 and 47; and a pair of third securing members, such as hooks 60, that are also disposed proximate the rear ends 50. As shown in FIG. 4, the hooks 56, 58 and 60 may be attached to the tracks 46 and 47 using rivets 61 or other suitable fasteners. Alternatively, the hooks 56, 58 and 60 may be integrally formed as part of the body 30, or the hooks 56, 58 and 60 may be attached to the body 30 in any suitable manner.

As shown in FIG. 12, the storage unit 22 includes a tray 62 and a plurality of wheels arranged in first and second rows 64 and 66, respectively. The first and second wheel rows 64 and 66, respectively, are engageable with the first and second tracks 46 and 47, respectively, and are guided by the first and second guide troughs 52 and 54, respectively, such that the storage unit 22 is movable in a controlled, straight path along the base 20. Each wheel row 64 and 66 has a front wheel 68 with an extended front axle 70, and a rear wheel 72 with an extended rear axle 74. Returning to FIG. 2, the front axles 70 of the front wheels 68 engage the first hooks 56, and the rear axles 74 of the rear wheels 72 engage the third hooks 60 when the storage unit 22 is in the stowed position to thereby inhibit forward and vertical movement of the storage unit 22. Furthermore, the front axles 70 of the front wheels 68 engage the second hooks 58 when the storage unit 22 is in the deployed position to thereby inhibit rearward and vertical movement of the storage unit 22.

As shown in FIGS. 2 and 12, each wheel row 64 and 66 also has a plurality of interior wheels 75 that are disposed proximate the rear wheel 72. Advantageously, with such a configuration of the wheel rows 64 and 66, the storage unit 22 is always firmly supported on the base 20 and/or tailgate 16 as the storage unit 22 moves between the stowed and deployed positions.

Figure 13:
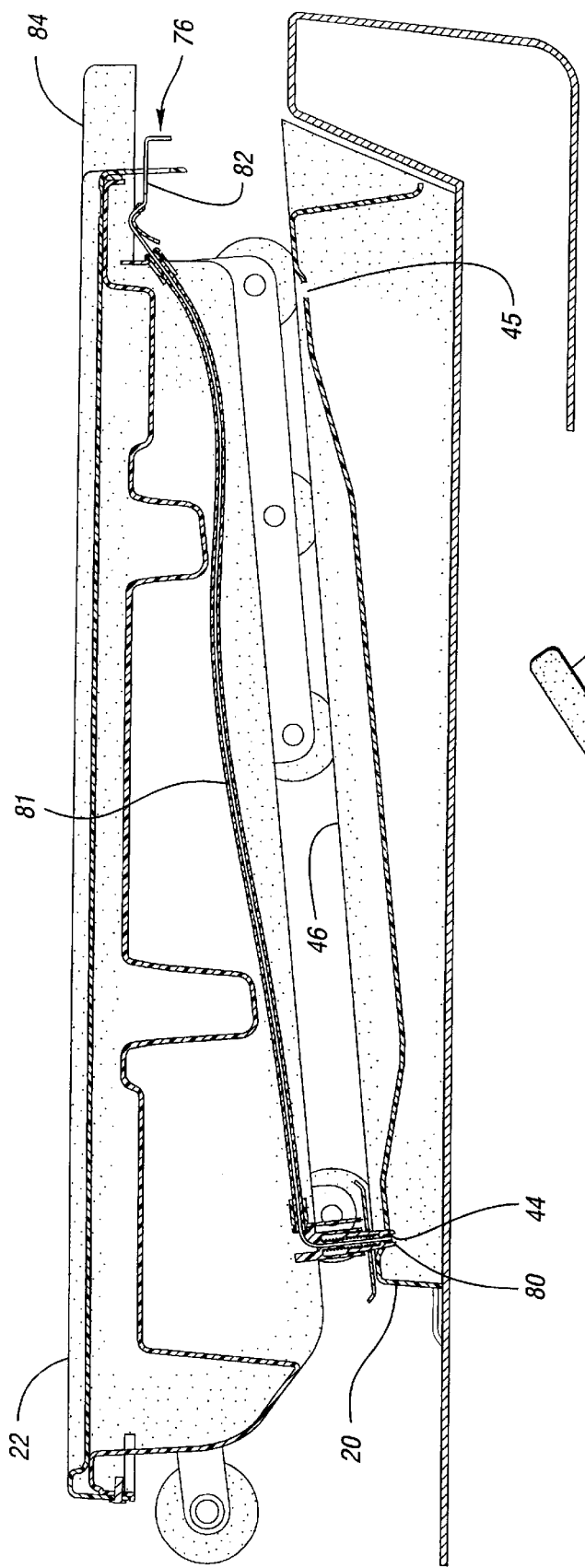
FIG. 13 is a sectional view of the storage unit and the base, with the storage unit in the stowed position.

As shown in FIGS. 2, 12 and 13, the storage unit 22 has at least one latch assembly 76 for further inhibiting movement of the storage unit 22 relative to the base 20. The latch assembly 76 includes at least one retractable engaging member, such as a latch or pin 80, which is connected to a release lever 82 by any suitable means such as a cable 81. The pin 80 is insertable into the aperture 44 when the storage unit 22 is in the stowed position, as shown in FIG. 13, and into the aperture 45 when the storage unit 22 is in the deployed position. The pin 80 may also be retracted from either of the apertures 44 and 45 by actuating the release lever 82 so that the storage unit 22 may be moved with respect to the base 20 and/or removed from the base 20. Advantageously, the latch assembly 76 and the first and third hooks 56 and 60 cooperate to effectively secure the storage unit 22 in the stowed position. Furthermore, the latch assembly 76 and the second hooks 58 cooperate to effectively secure the storage unit 22 in the deployed position.

Figure 14:
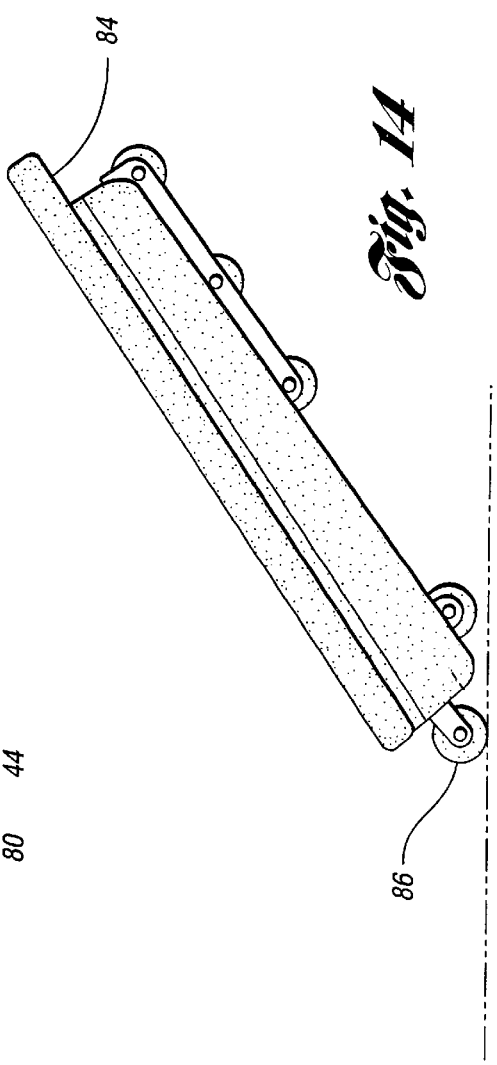
FIG. 14 is a side view of the storage unit.

As shown in FIGS. 12, 13 and 14, the storage unit 22 further includes one or more handles 84 for easily moving the storage unit 22 along the tracks 46 and 47, as well as for moving the storage unit 22 outside of the vehicle 12. One or more wheels 86 may also be provided on an end of the tray 62 for moving the storage unit 22 outside of the vehicle 12 as shown in FIG. 14.

Figure 15:
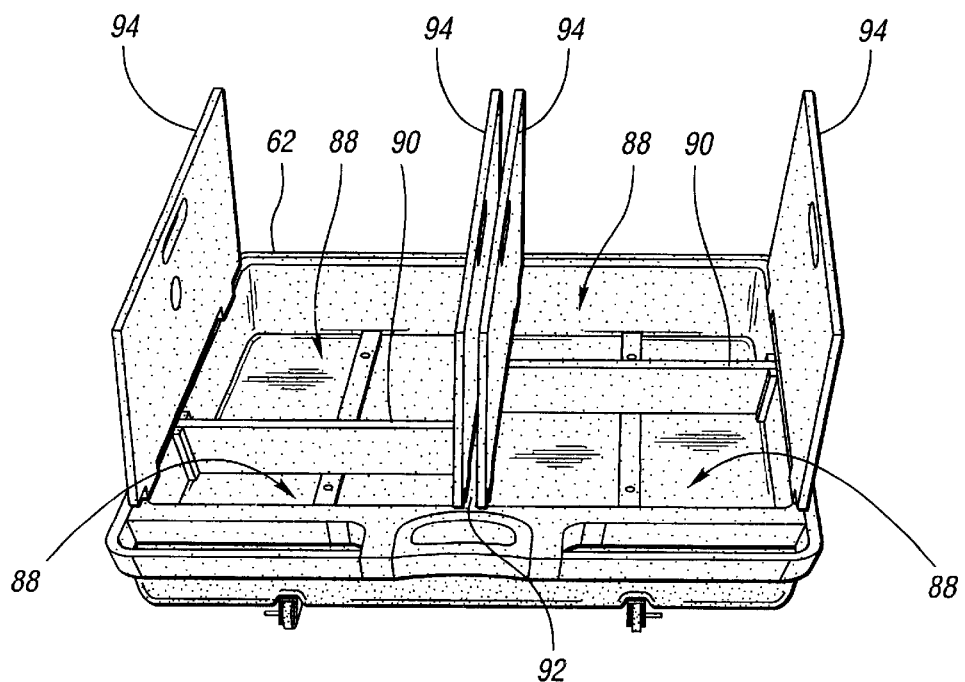
FIG. 15 is a perspective view of the storage unit and showing a plurality of doors connected to the tray.

As shown in FIG. 15, the tray 62 may be divided into two or more compartments 88 using removable divider panels 90 and a fixed divider panel 92. A plurality of lids or doors 94 are also connected to the tray 62, and the doors 94 are moveable between a closed position and an open position shown in FIG. 15.

Figure 16:
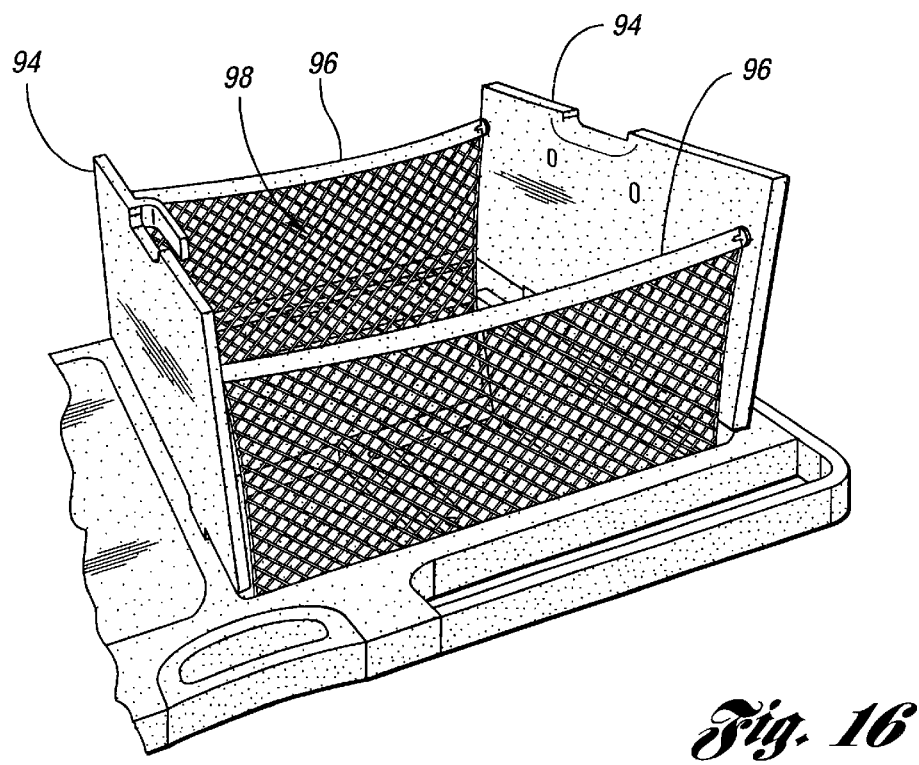
FIG. 16 is a fragmentary perspective view of the storage unit showing opposing doors in an opened position with a net connected between the doors.

Furthermore, as shown in FIG. 16, one or more nets 96 may be connected between opposing doors 94. When the doors 94 are in the open position, the nets 96 preferably extend between the doors 94 to define a storage bin 98. Advantageously, each storage bin 98 may be used to store relatively tall objects such as grocery bags and/or boxes.

While the base 20 and storage unit 22 may comprise any suitable material, in a preferred embodiment of the storage system 10, the base 20 and storage unit 22 preferably comprise molded plastic such as polypropylene, polyethylene, or a glass-reinforced material. Furthermore, the base 20 and storage unit 22 are preferably configured to support loads of up to 400 pounds or more to maximize utility.

To use the storage system 10, the vehicle tailgate 16 is first moved to an open position shown in phantom lines in FIG. 2. Next, the release lever 82 is actuated to release the pin 80 from the aperture 44. The storage unit 22 may then be moved along the base 20 to the deployed position such that the front axles 70 of the front wheels 68 are engaged with the second hooks 58, and the pin 80 is engaged with the aperture 45. Next, objects may be placed within and/or on top of the storage unit 22. Advantageously, because the storage unit 22 preferably extends over the tailgate 16 when in the deployed position, the storage unit 22 is easily accessible.

Once the storage unit 22 has been sufficiently loaded, the release lever 82 may again be actuated to release the pin 80 from the aperture 45. The storage unit 22 may then be returned to the stowed position where it is secured in place by the latch assembly 76 and the first and third hooks 56 and 60, respectively. Advantageously, because the tracks 46 and 47 slope downwardly toward the front of the vehicle 12, the tracks 46 and 47 provide a gravity assist feature for returning the storage unit 22 to the stowed position.

According to a feature of the invention, the storage unit 22 may also be removed from the vehicle 12, and used for storage and/or support outside of the vehicle 12. For example, the storage unit 22 may be used as a dolly for transporting objects outside of the vehicle 12. As another example, the storage unit 22 may be insulated and heated or cooled, such as with a thermal unit, for storing food and/or beverages.

FIG. 17 shows a second embodiment 110 of the storage system for use with a motor vehicle 112 having a floor 114 and a tailgate 116. Because the vehicle 112 does not have a sill, the storage system 110 need not include a raised base or retainer brackets such as provided with the storage system 10. The storage system 110, however, does include a storage unit 118 that has all of the features of the storage unit 22 of the storage system 10. The storage system 110 is also provided with a plurality of securing members for securing the storage unit 118 to the floor 114. Preferably, the securing members include a pair of first hooks 120, and a pair of integrally formed second and third hooks 122 and 124, respectively. The first, second and third hooks 120, 122 and 124 function similarly to the first, second and third hooks 56, 58 and 60, respectively, of the storage system 10. Specifically, the first and third hooks 120 and 124 function to secure the storage unit 118 in a first stowed position, shown in solid lines in FIG. 17, and the second hooks 122 function to secure the storage unit 118 in a deployed position shown in phantom lines in FIG. 17, such that the storage unit 118 extends over the tailgate 116.

The hooks 120, 122 and 124 are preferably adapted to be movably mounted to the floor 114 such that the hooks 120, 122 and 124 may be recessed into the floor 114 when not in use. The floor 114 is also preferably provided with a pair of first recesses 126 for receiving the first hooks 120, and a pair of second recesses 128 for receiving the second and third hooks 122 and 124. Furthermore, the floor 114 is preferably provided with first and second notches or apertures 130 and 132, respectively, for receiving the pin 80 of the latch assembly 76.

The storage unit 118 preferably includes a pair of guide grooves or slots 134 that are engageable with the hooks 120, 122 and 124 for guiding the storage unit 118 as the storage unit 118 moves along the floor 114. The storage unit 118 is partially broken away in FIG. 17 to reveal a portion of one of the guide slots 134. Alternatively or supplementally, the floor 114 may be provided with tracks for guiding the storage unit 118 between the stowed and deployed positions. The storage unit 118 may also be removed from the vehicle 112 in a manner similar to the storage unit 22.

The storage system 110 may also include a roof mounted base or luggage rack 136 that is configured to receive the storage unit 118. For example, the luggage rack 136 may be provided with a pair of tracks 138 for receiving the wheels of the storage unit 118. The luggage rack 136 may also be provided with first and second notches or apertures 140 and 142, respectively, for receiving the latch assembly 76. Furthermore, the luggage rack 136 may include a plurality of securing members such as a pair of first hooks 144, a pair of second hooks 146, and a pair of third hooks 148 for securing the storage unit 118 to the luggage rack 136 in a second stowed position, which is also shown in phantom lines in FIG. 17. With such a configuration, the storage system 110 provides multiple storage options.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, the storage system 10 may also be provided with a roof mounted base or luggage rack for receiving the storage unit 22.

What is claimed is:

1. A storage system for a motor vehicle having a tailgate, the storage system comprising:
    a base adapted to be secured to the vehicle, the base including a securing member and a track, the track having front and rear ends and being inclined such that the track slopes upwardly toward the rear end; and
    a movable storage unit having a wheel and being movable between a stowed position and a deployed position with respect to the vehicle, the wheel being engageable with the track and having an axle engageable with the securing member to inhibit movement of the storage unit, wherein the storage unit extends at least partially over the tailgate when the storage unit is in the deployed position.

2. The storage system of claim 1 wherein the securing member includes first and second hooks disposed proximate the front and rear ends, respectively, of the track, and wherein the axle engages the first hook when the storage unit is in the stowed position, and the axle engages the second hook when the storage unit is in the deployed position.

3. The storage system of claim 1 wherein the track has a trough for guiding the wheel.

4. The storage system of claim 1 wherein the base has an aperture, and the storage unit has a retractable member engageable with the aperture for inhibiting movement of the storage unit relative to the base.

5. The storage system of claim 4 wherein the retractable member is a pin.

6. The storage system of claim 1 wherein the securing member includes a first hook, and the wheel is engageable with the first hook to inhibit movement of the storage unit when the storage unit is in the stowed position.

7. The storage system of claim 1 wherein the securing member includes first and second hooks, and wherein the axle engages the first hook when the storage unit is in the stowed position, and the axle engages the second hook when the storage unit is in the deployed position.

8. The storage system of claim 7 further comprising a third hook attachable to the vehicle, wherein the storage unit includes an additional wheel having an additional axle, the additional axle engaging the third hook when the storage unit is in the stowed position.

9. The storage system of claim 1 wherein the storage unit includes a guide slot that is engageable with the securing member for guiding the storage unit as the storage unit moves between the stowed and deployed positions.

10. A storage system for a motor vehicle having a floor, the storage system comprising:
    a base having a body and a plurality of mounting brackets attached to the body, the plurality of mounting brackets being adapted to be attached to the floor so as to secure the base to the floor, the plurality of mounting brackets including a first mounting bracket that is movably attached to the body and movable laterally with respect to the body along a straight line so that the first mounting bracket is attachable to the floor after the body is positioned with respect to the floor; and
    a movable storage unit engageable with the base.

11. The storage system of claim 10 further comprising a plurality of retainer brackets adapted to be secured to the floor, wherein the mounting brackets are engageable with the retainer brackets.

12. The storage system of claim 10 wherein the base has an aperture, and the storage unit has a retractable member engageable with the aperture for inhibiting movement of the storage unit relative to the base.

13. The storage system of claim 12 wherein the member is a pin.

14. The storage system of claim 10 wherein the base further includes first and second tracks, and the storage unit includes first and second rows of wheels that are engageable with the first and second tracks respectively.

15. The storage system of claim 14 wherein each track has a front end and a rear end, and the tracks are inclined relative to the floor such that the tracks slope upwardly toward the rear ends.

16. The storage system of claim 14 wherein the storage unit is movable between a stowed position and a deployed position, and wherein each track has a front end and a rear end, the base further has a pair of first hooks disposed proximate the front ends of the tracks, and a pair of second hooks disposed proximate the rear ends of the tracks, and each row of wheels has a front wheel with an elongated front axle, the front axles engaging the first hooks when the storage unit is in the stowed position, and the front axles engaging the second hooks when the storage unit is in the deployed position.

17. The storage system of claim 16 wherein the base further has a pair of third hooks disposed proximate the rear ends of the tracks, and each row of wheels has a rear wheel with an elongated rear axle, the rear axles engaging the third hooks when the storage unit is in the stowed position.

18. The storage system of claim 14 wherein the first track has a first trough for guiding the first row of wheels, and the second track has a second trough for guiding the second row of wheels.

19. The storage system of claim 10 wherein the body has a first channel, and the first mounting bracket includes a first handle that extends through the first channel, and wherein the first handle is movable along the first channel so as to move the first mounting bracket laterally with respect to the body.

20. The storage system of claim 19 wherein the body has a second channel, and the plurality of mounting brackets includes a second mounting bracket having a second handle that extends through the second channel, and wherein the second handle is movable along the second channel so as to move the second mounting bracket laterally with respect to the body such that the second mounting bracket is attachable to the floor after the body is positioned with respect to the floor.

21. A storage system for a motor vehicle having a floor, the storage system comprising:

a base having a body and a plurality of mounting brackets attached to the body and adapted to be attached to the floor so as to secure the base to the floor, the body having first and second tracks, each track having a front end and a rear end, the tracks being inclined relative to the floor such that the tracks slope upwardly toward the rear ends of the tracks, at least one of the mounting brackets being movable with respect to the body so that the at least one mounting bracket is attachable to the floor after the body is positioned with respect to the floor, the base further having a pair of first hooks disposed proximate the front ends of the tracks and a pair of second hooks disposed proximate the rear ends of the tracks; and a movable storage unit having first and second rows of wheels that are engageable with the first and second tracks, respectively, such that the storage unit is movable between a stowed position and a deployed position, each row of wheels having a front wheel with an elongated front axle, the front axles engaging the first hooks when the storage unit is in the stowed position, and the front axles engaging the second hooks when the storage unit is in the deployed position.

22. A storage system for use with a motor vehicle having an interior floor, the storage system comprising:

a pair of first hooks adapted to be movably mounted to the vehicle such that the first hooks may be recessed into the floor of the vehicle when not in use; and a storage unit having a plurality of wheels and being movable between a stowed position and a deployed position, the plurality of wheels including a pair of first wheels that are engageable with the first hooks to inhibit movement of the storage unit when the storage unit is in the stowed position.

23. The storage system of claim 22 further comprising a pair of second hooks adapted to be mounted to the vehicle, the first wheels being engageable with the second hooks to inhibit movement of the storage unit when the storage unit is in the deployed position.

24. The storage system of claim 22 wherein the storage unit comprises a guide slot that is engageable with one of the first hooks to guide the storage unit as the storage unit moves between the stowed and deployed positions.

25. A storage system for use with a motor vehicle having an interior and a roof, the storage system comprising:

a first securing member adapted to be mounted to the interior of the vehicle;

a base adapted to be mounted to the roof, the base having a track and a second securing member;

a storage unit having a wheel including an axle, the storage unit being movable between a first stowed position and a deployed position with respect to the interior of the vehicle, the storage unit being engageable with the first securing member to inhibit movement of the storage unit, the storage unit further being removable from the interior of the vehicle and mountable on the base such that the wheel engages the track of the base, the axle being engageable with the second securing member for securing the storage unit in a second stowed position.

26. The storage system of claim 25 wherein the axle is engageable with the first securing member to inhibit movement of the storage unit when the storage unit is disposed in the interior of the vehicle.

27. A storage system for a motor vehicle, the storage system comprising:

a base adapted to be secured to the vehicle and including first and second tracks, the first track including a first guide trough having a first width, and the second track including a second guide trough having a second width greater than the first width; and a movable storage unit having first and second wheels that are engageable with the first and second tracks, respectively, such that the storage unit is movable between a stowed position and a deployed position.

28. The storage system of claim 27 wherein each track has a front end and a rear end, and the tracks slope upwardly toward the rear ends of the tracks.

29. The storage system of claim 28 wherein the storage system extends at least partially over a tailgate of the vehicle when the storage unit is in the deployed position.

30. The storage system of claim 27 wherein the base includes a securing member, and wherein one of the wheels is engageable with the securing member so as to inhibit movement of the storage unit.

31. The storage system of claim 30 wherein the one wheel includes an axle that is engageable with the securing member.

32. A storage system for a motor vehicle, the storage system comprising:

a securing member attachable to the vehicle; and a movable storage unit having a wheel and a guide slot, the storage unit being movable between a stowed position and a deployed position with respect to the vehicle, the guide slot being engageable with the securing member so as to guide the storage unit as the storage unit moves between the stowed and deployed positions.

33. The storage system of claim 32 wherein the securing member includes a first hook, and wherein the guide slot is engageable with the first hook so as to guide the storage unit as the storage unit moves between the stowed and deployed positions.

34. The storage system of claim 32 wherein the storage unit has a bottom surface, and the guide slot is disposed on the bottom surface.

35. A storage system for a motor vehicle having a tailgate, the storage system comprising:

a base adapted to be secured to the vehicle, the base having a track, a first hook and a second hook; and a movable storage unit having a first wheel that is engageable with the track such that the storage unit may be moved between a stowed position and a deployed position, the first wheel being engageable with the first hook to inhibit movement of the storage unit when the storage unit is in the stowed position, the first wheel further being engageable with the second hook to inhibit movement of the storage unit when the storage unit is in the deployed position, wherein the storage unit extends at least partially over the tailgate when the storage unit is in the deployed position.

36. The storage system of claim 35 wherein the base further includes a third hook, and the storage unit further includes a second wheel that is engageable with the track, the second wheel also being engageable with the third hook to further inhibit movement of the storage unit when the storage unit is in the stowed position.

37. The storage system of claim 35 wherein the storage unit forwardly of the tailgate when the storage unit is in the stowed position.

38. The storage system of claim 35 wherein the first wheel has a first axle that is engageable with the first hook to inhibit movement of the storage unit when the storage unit is in the stowed position, the first axle further being engageable with the second hook to inhibit movement of the storage unit when the storage unit is in the deployed position.

39. The storage system of claim 38 wherein the storage unit is disposed forwardly of the tailgate when the storage unit is in the stowed position.

40. The storage system of claim 35 wherein the base further includes a third hook, and the storage unit further includes a second wheel that is engageable with the track, the first wheel having a first axle that is engageable with the first hook to inhibit movement of the storage unit when the storage unit is in the stowed position, the first axle further being engageable with the second hook to inhibit movement of the storage unit when the storage unit is in the deployed position, the second wheel having a second axle that is engageable with the third hook to further inhibit movement of the storage unit when the storage unit is in the stowed position.

41. The storage system of claim 40 wherein the storage unit is disposed forwardly of the tailgate when the storage unit is in the stowed position.

42. A storage system for a motor vehicle, the storage system comprising:
   first, second and third hooks attachable to the vehicle; and
   a movable storage unit having first and second wheels and being movable between a stowed position and a deployed position with respect to the vehicle, the first wheel having a first axle and the second wheel having a second axle, wherein the first axle engages the first hook and the second axle engages the third hook when the storage unit is in the stowed position so to inhibit movement of the storage unit, and the first axle engages the second hook when the storage unit is in the deployed position.

43. The storage system of claim 42 wherein the first and second wheels are arranged in a row.

44. The storage system of claim 42 further comprising a base, the base including the hooks and a track, wherein the wheels engage the track when the storage unit is in the stowed position.

* * * * *